United States Patent [19]

Heuck

[11] 4,112,537
[45] Sep. 12, 1978

[54] GRILL SCRAPER

[75] Inventor: Roger W. Heuck, Cincinnati, Ohio

[73] Assignee: M. E. Heuck Company, Cincinnati, Ohio

[21] Appl. No.: 863,947

[22] Filed: Dec. 23, 1977

[51] Int. Cl.² .................... A47J 37/07; A47L 17/00; B25F 1/04

[52] U.S. Cl. .................... 15/105; 15/236 C; 7/168; 30/172

[58] Field of Search .................... 15/104.04, 105, 236; 7/1 A, 1 R, 16; 30/169, 172; 81/57.5; 145/50 C

[56] References Cited

U.S. PATENT DOCUMENTS

| 1,645,999 | 10/1927 | Reboul | 81/57.5 |
| 3,434,175 | 3/1969 | Bray | 15/105 |
| 3,800,354 | 4/1974 | Stephens | 15/104.04 X |

FOREIGN PATENT DOCUMENTS

| 561,545 | 8/1923 | France | 81/57.5 |
| 505,732 | 8/1930 | Fed. Rep. of Germany | 30/172 |
| 580,305 | 9/1946 | United Kingdom | 81/57.5 |

*Primary Examiner*—Daniel Blum
*Attorney, Agent, or Firm*—Melville, Strasser, Foster & Hoffman

[57] ABSTRACT

A tool for scraping the wires or rods constituting a barbeque grill or the like. The tool has a handle terminating in a stiff extension having a U-shaped distal end. A wheel is pivotably secured at its center to said extension and has a plurality of U-shaped indentations of different widths. The wheel may be rotated to align a suitably sized U-shaped indentation thereof with the U-shaped distal end of said extension. The latter indentation is of a width equal to the largest of the indentations in the wheel and of a depth equal to the deepest indentation in the wheel. The extension or backing element prevents rotation of the indented wheel during a scraping operation.

4 Claims, 3 Drawing Figures

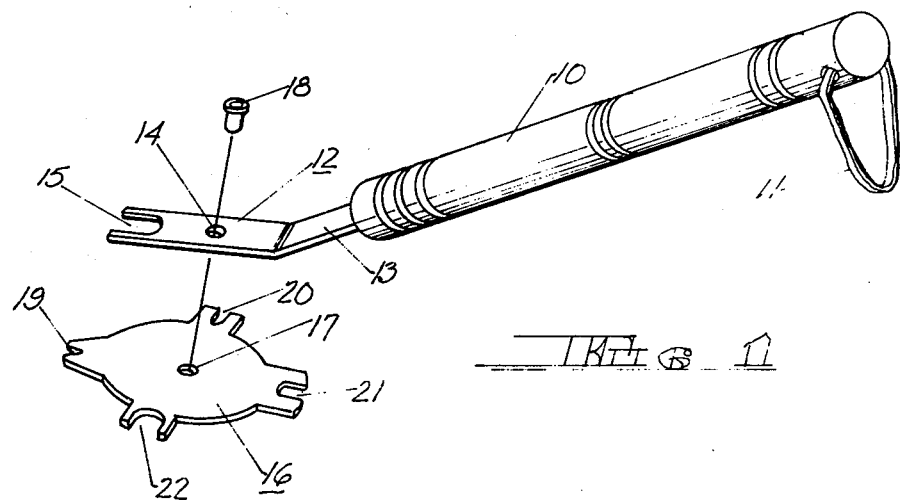
FIG. 1
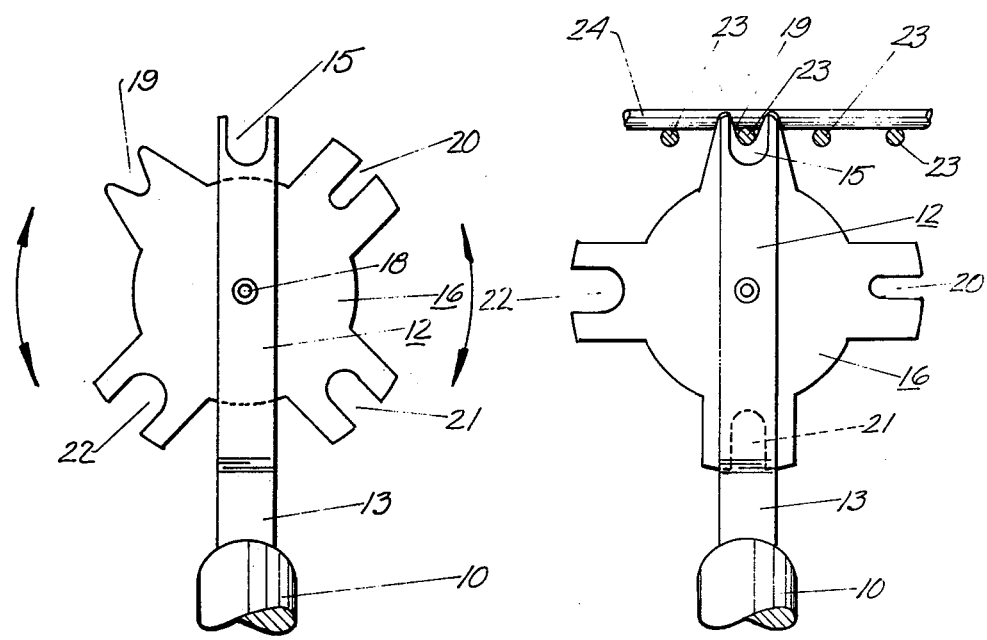
FIG. 2
FIG. 3

GRILL SCRAPER

BRIEF SUMMARY OF THE INVENTION

Outdoor cookery has become increasingly popular in recent years, until there is now an outdoor grill in practically every backyard. There has been a good deal of argument in connection with the cleaning of such grills. Some think a grill should never be cleaned; but those who feel that cleaning is necessary from time to time, find the job very difficult, hard on the hands, and generally unpleasant. One of the most difficult parts to be cleaned is the grill proper, i.e. the assembly of rods or heavy wires which is generally mounted in a frame supported above the fire, and which support the food being grilled.

Grill scrapers have been proposed in the past, but all have been subjected to various disadvantages. Most have been designed for scraping rods or wires of a particular size. Others, in attempting to provide a more versatile tool, have tried wheels with scraping elements for different sized rods. These have been unstable, and tend to turn in use.

Accordingly, the present invention overcomes these difficulties by providing a wheel having a plurality of rod-scraping elements of different widths, mounted on a backing support forming part of the tool handle, and having a U-shaped notch of a width equal to that of the largest rod scraping element. Thus the wheel may rotated to align any of the rod scraping elements with the notch in the support member, and this will hold the scraping element against rotation during the scraping operation.

BRIEF DESCRIPTION OF THE FIGURES OF THE DRAWING

FIG. 1 is a perspective exploded view of the device of the invention.

FIG. 2 is a fragmentary plan view of the scraping wheel and support member as seen from above in FIG. 1.

FIG. 3 is a view similar to FIG. 2 showing the device in use.

DETAILED DESCRIPTION

It will be understood that where the term "rods" has been used hereinafter in connection with the description or the claims, the term is intended to include heavy wires such as are used in making up the grill proper.

Referring particularly to FIG. 1, the device may have a handle member indicated at 10 which may be provided with a thong 11 for hanging it up. Secured to the distal end of the handle 10 is a support member generally indicated at 12. The shank 13 of the member 12 is suitably secured to the handle member 10 and as can be seen in FIG. 1 is bent at an obtuse angle to the handle. Substantially centrally of the member 12 is provided a hole 14 and the distal end of the member 12 is provided with a U-shaped notch 15.

A scraper wheel, generally indicated at 16, has a central hole 17 and it is secured to the member 12 by means of a rivet 18 passing through the holes 14 and 17. It will be seen that the wheel 16 is now secured to the member 12 in a rotatable manner so that any of the scraping extensions 19, 20, 21 or 22 can be aligned with the notch 15. The notch 15 is of a width substantially equal to the widest of the slots in the scraping wheel (i.e. the slot 22) and is as deep as the deepest of the various slots 19 through 22.

It will be clear from FIG. 2 that the wheel 16 may be rotated in either direction to align any of the scraping elements 19 through 22 with the notch 15 in the support 12.

One of the scraping elements 19 is shown lined up with the notch 15 in FIG. 3 so as to scrape one of the rods 23. A cross rod 24 may be of a different size than the rods 23 and if so the wheel 16 may be rotated to bring a different one of the notches 20 through 22 into alignment with the notch 15.

It will be seen that since the notch 15, which is aligned with the particular scraping element being used, also embraces the rod being cleaned, the wheel 16 will not turn during use as has been the problem generally in the past.

It will be understood that numerous modifications may be made without departing from the spirit of the invention, and therefore no limitation which is not specifically set forth in the claims is intended and no such limitation should be implied.

The embodiments of the invention in which an exclusive property or privilege is claimed are defined as follows:

1. A tool for scraping the rods or wires constituting a grill, comprising
    (a) a handle member,
    (b) a support fixed to the distal end of said handle member,
    (c) a scraper wheel having a plurality of rod scraping extensions having notches of different widths and depths on its periphery, and rotatably secured to said support,
    (d) said support having at its distal end a U-shaped notch of a width substantially the same size as but at least equal to the width of the widest scraping notch on said wheel and of a depth at least equal to the deepest scraping notch, whereby the notch of any of said scraping extensions may be aligned with said U-shaped notch to hold said wheel against rotation during a scraping operation.

2. The device according to claim 1, wherein said scraping elements are in the form of U-shaped extensions from said wheel, the ends of said extensions being substantially coterminus with the distal end of said U-shaped notch.

3. The device according to claim 2, wherein said wheel has four symmetrically disposed scraping extensions.

4. The structure according to claim 3, wherein said support is disposed at an obtuse angle to said handle member.